Dec. 8, 1925.
W. G. ANDERSON
1,564,190
DUMPING PLATFORM
Filed March 5, 1925    3 Sheets-Sheet 1
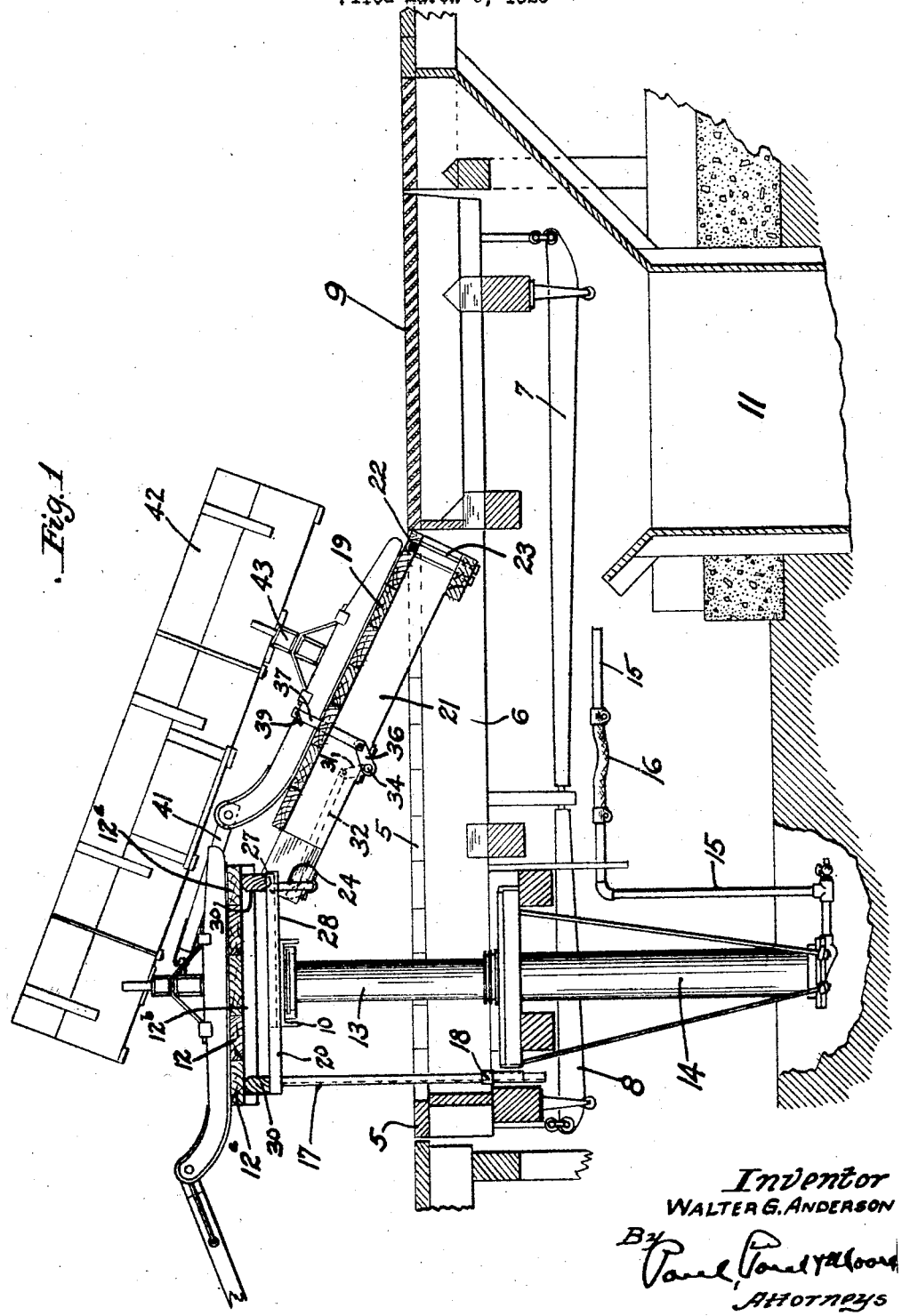
Inventor
WALTER G. ANDERSON
By
Attorneys Dec. 8, 1925.
W. G. ANDERSON
1,564,190
DUMPING PLATFORM
Filed March 5, 1925    3 Sheets-Sheet 2
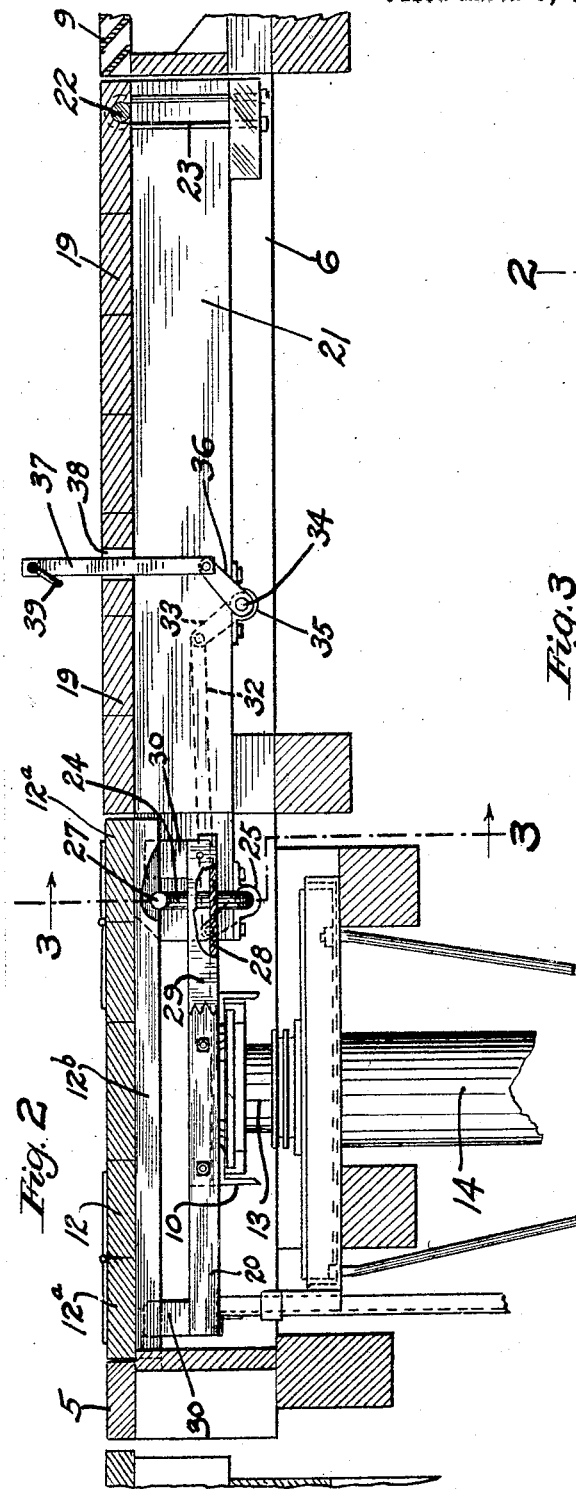
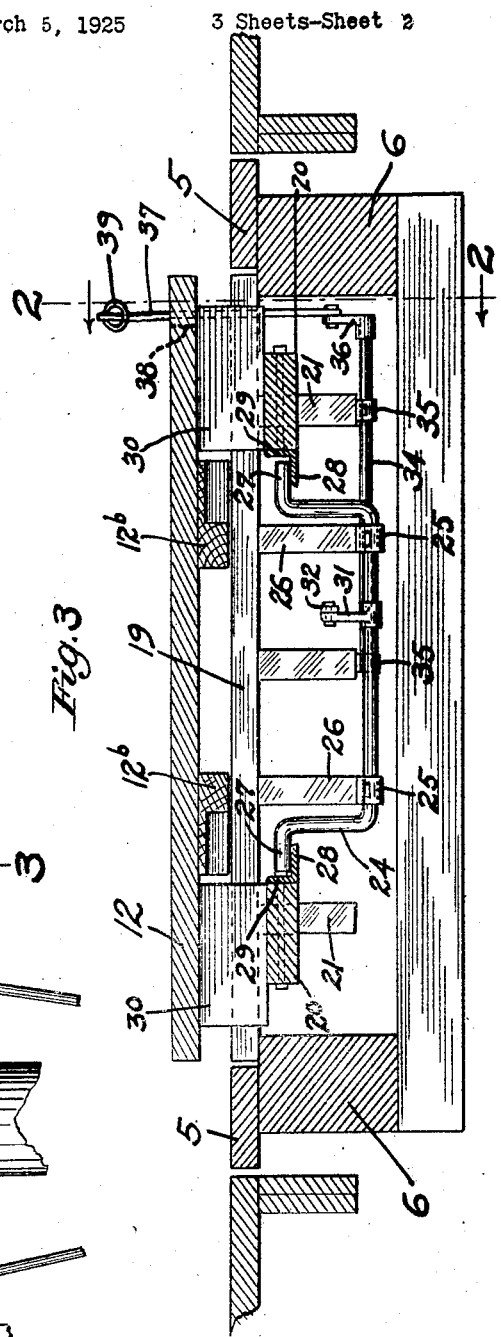
Inventor
WALTER G. ANDERSON
By
Paul, Paul & Moore
Attorneys

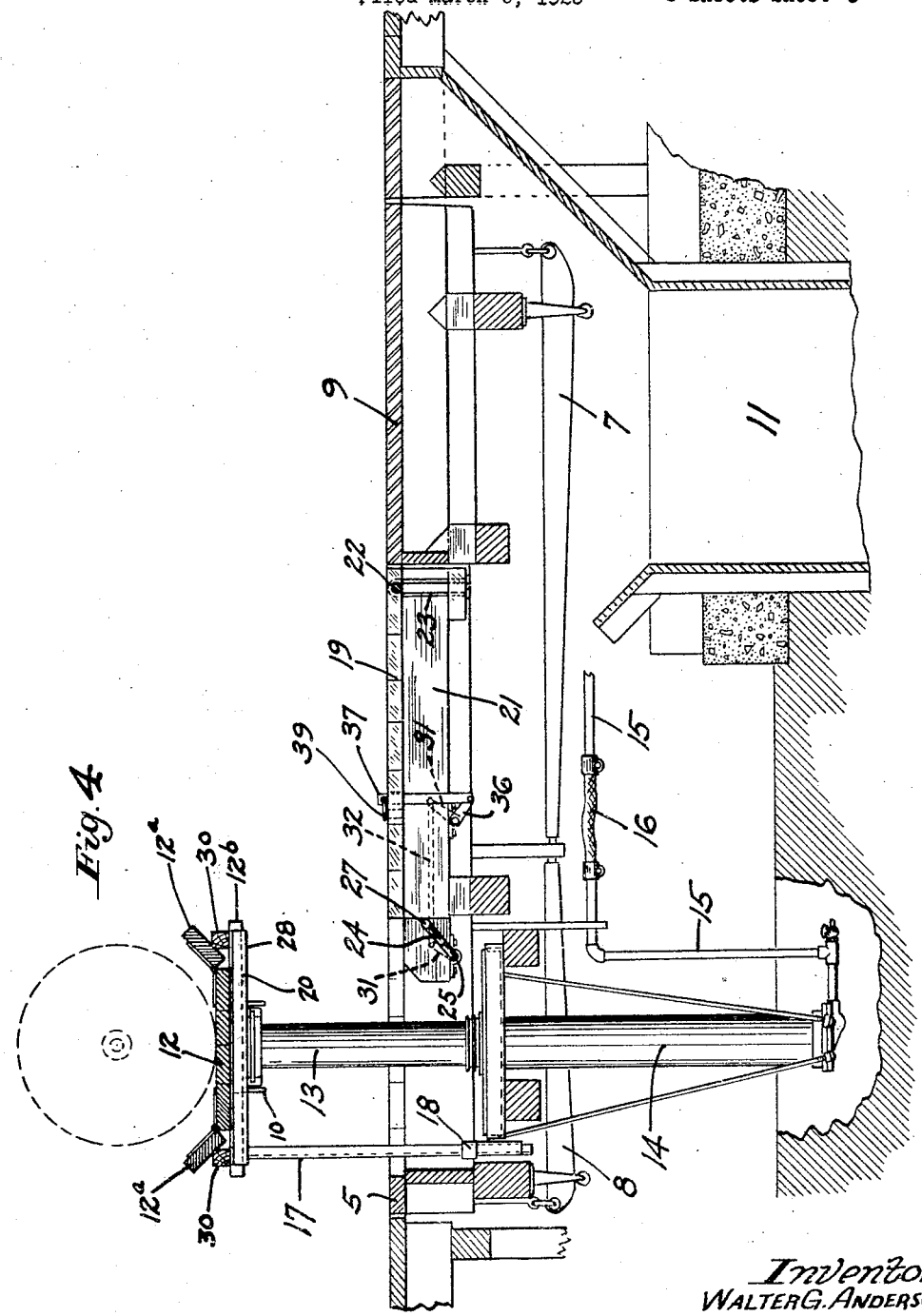

Patented Dec. 8, 1925.

1,564,190

UNITED STATES PATENT OFFICE.

WALTER G. ANDERSON, OF MINNEAPOLIS, MINNESOTA, ASSIGNOR TO STRONG-SCOTT MANUFACTURING COMPANY, OF MINNEAPOLIS, MINNESOTA, A CORPORATION OF MINNESOTA.

DUMPING PLATFORM.

Application filed March 5, 1925. Serial No. 13,325.

*To all whom it may concern:*

Be it known that I, WALTER G. ANDERSON, a citizen of the United States, resident of Minneapolis, county of Hennepin, and State of Minnesota, have invented certain new and useful Improvements in Dumping Platforms, of which the following is a specification.

This invention relates to improvements in vehicle dumping platforms adapted for use with or without wagon scales in grain elevator driveways and other places for elevating the forward end of a vehicle or sled for the purpose of unloading or discharging the load, and more particularly it relates to such a structure adapted for use during the summer months for unloading wheeled vehicles and capable of ready and convenient adjustment or adaptation for use with a sled vehicle in the winter months. Generally speaking, however, for a greater portion of the year, the apparatus will be used as an ordinary dumping platform for wheeled vehicles.

The invention is designed as an improvement over the structure shown in Patent #1,518,780 granted to Marcus A. Erickson, December 9, 1924.

In a dumping platform of the type disclosed in said patent, the main portion of the platform is stationary and a sled vehicle is handled in the same manner as one equipped with wheels. This is objectionable owing to the strain to which the reach between the sled runners is subjected when the forward portion of the vehicle is raised and also to the twisting or racking to which the sled bolster is subjected when an attempt is made to raise the forward portion of the sled vehicle, leaving the rear runners in a substantially horizontal position.

In platforms of other types, a tilting section is provided to adapt it for sled vehicles, but the tilting section is continuously raised with the lifting of the forward portion of the vehicle in dumping those equipped with wheels as well as those with runners. This continual raising and lowering of the tilting section is objectionable not only because it is very unnecessary in dumping a wheeled vehicle but particularly because it requires additional power in the lifting operation.

An object, therefore, of my invention is to provide a dumping platform having a section capable of tilting but normally forming a stationary continuation of the horizontal portion of the platform when used with wheeled vehicles, provision being made for easily and quickly connecting the tilting section with the lifting portion of the platform so that the apparatus, during the winter months or at any other time for that matter, can be instantly adapted for dumping sled vehicles and as readily converted into a platform for handling wheeled vehicles.

Another object of the invention is to provide a dumping platform having a lifting section, and a tilting section adapted to be operatively connected with the former so that it may be used for dumping either wheeled or sled vehicles, and which platform, when used in conjunction with a platform wagon scale, will have the tilting section and its connecting means mounted upon and supported by the movable frame of the scale platform. By thus mounting the tilting section of the platform and its supporting means upon the scale platform, the latter will not interfere with the weighing scale when operatively connected to the lifting section, should the lifting mechanism not be carried by the scale frame but be supported upon a stationary foundation beneath the scale platform.

Other objects of the invention will appear from the following description and the accompanying drawings and will be pointed out in the annexed claims.

In the accompanying drawings there has been disclosed a structure designed to carry out the various objects of the invention, but it is to be understood that the invention is not confined to the exact features shown, as various changes may be made within the scope of the claims which follow.

In the accompanying drawings forming part of this specification,

Figure 1 is a vertical sectional view of the improved dumping platform showing a sled positioned thereon and in unloading or dumping position;

Figure 2 is an enlarged detail sectional view on the line 2—2 of Figure 3;

Figure 3 is a cross sectional view on the line 3—3 of Figure 2 showing the lifting platform partially elevated and also showing the means provided for connecting the intermediate portion of the dumping platform to the lifting portion thereof;

Figure 4 is a view similar to Figure 1, but showing the intermediate portion of the platform disconnected from the lifting portion thereof.

In the selected embodiment of the invention here shown there is illustrated a platform scale of the type ordinarily employed in conjunction with grain elevators for unloading grain from a truck, wagon or sled. As shown in Figure 1, the scale comprises a weighing platform 5 mounted on the side rails 6, which are supported in the usual manner upon the scale beams 7 and 8. The rear portion of the weighing platform 5 is preferably provided with an open grating 9 through which the load may be discharged into a suitable receiving means or hopper 11 usually arranged beneath the scale platform.

A lifting platform 12 is provided adjacent the forward end of the structure. This lifting platform, when in normal inoperative position as shown in Figure 2, will be supported by the side beams 6 of the scale frame. The means provided for lifting or elevating the platform 12 consists of a cross head 10 mounted upon a ram or plunger which is slidably mounted in a cylinder 14 and may be operable therein by such means as compressed air supplied to the lower portion of the cylinder by means of a pipe 15 connected to a suitable source of air supply, (not shown). A flexible hose connection 16 is preferably interposed in the pipe section 15 to allow movement of the scale platform.

The cross head 10 comprises a pair of side rails 20 having lifting blocks 30 mounted thereon and adapted to engage the hinged sections 12ª of the lifting platform 12. When the cross head 10 is elevated the lifting blocks 12 will engage the hinged sections 12ª of the lifting platform thereby causing them to be oscillated upon their hinges to the position shown in Figure 4, and in which position the cross members 12ᵇ of the lifting platform will be supported upon the inwardly extending horizontal flanges 28 of the angles 29, shown in Figure 3. The purpose of thus upwardly swinging the two hinged sections 12ª of the lifting platform 12 is to provide means for preventing the forward wheels of a truck or wagon from rolling off the platform when in raised dumping position, as shown in Figure 4. It will also be noted by reference to Figure 2 that the lifting blocks 30 are of such height as to be out of engagement with the hinged sections of the lifting platform when the latter is seated upon the side beams 6 of the scale frame. The purpose of thus spacing the lifting blocks 30 from the lifting platform, when in normal inoperative position, is to provide clearance between the weighing scale platform and the lifting means should the lifting means be mounted upon a stationary foundation instead of being supported by the scale frame as shown in the accompanying drawings. A gate 17 is preferably connected to the forward end of the lifting platform 12 and is movable therewith, suitable guides 18 being provided on the frame of the scale to guide the gate in its up and down movement when the lifting platform 12 is actuated. The function of this gate is to prevent animals or persons from falling into the pit beneath the scale when the lifting platform is elevated.

The feature of this invention resides in the novel means provided for lifting or raising to an inclined position, the rear runners or section of a sled when positioned on the scale platform for unloading purposes. Such means preferably consists of an intermediate section 19 of the scale or dumping platform which is mounted on suitable rails 21 pivotally connected to the main portion of the platform by means of a transverse rod or shaft 22. This rod or shaft may be suitably secured to the side beams 21 by such means as the U-shaped bolts 23. The intermediate platform section 19 is of such size as to receive the rear runners of the sled when the front runners are positioned upon the lifting platform 12.

The means provided for operatively connecting the intermediate portion 19 of the platform to the lifting portion, is clearly shown in Figures 2 and 3. Such means preferably consists of a yoke-shaped member 24 pivotally mounted in bearings 25 secured to the lower edge of the intermediate beams 26 of the intermediate platform section. The upper outwardly extending end portions 27 of the yoke-member 24 are adapted to engage the inwardly projecting flanges 28 of a pair of rails 29, secured to the frame of the lifting platform 12. An arm 31 is mounted upon the lower portion of the yoke member 24 and has a connecting link 32 connecting it with a similar arm 33 mounted upon an operating shaft 34 mounted in bearings 35 secured to the frame of the intermediate platform section. One end of the shaft 34 outwardly projects to a joint adjacent one of the side beams 6 of the scale platform 5 and has a crank arm 36 terminally mounted thereon. An operating bar 37 has one end pivotally connected to the crank arm 36 and upwardly projects therefrom through the opening 38 in the intermediate platform section 19 to a point where it may be conveniently reached by an operator. A hand grip 39 is preferably provided on the operating bar 37 for the convenience of the operator in moving the bar 37 from operative to inoperative position. When the operating bar 37 is in the position shown in Figure 2, the yoke member 24 will be oscillated in its bearings 25 substantially to a vertical position, in which position the outwardly projecting end portions 27 thereof will be moved into alignment with the inwardly projecting flanges 28 of the lifting platform so that when the latter are upwardly moved by the upward movement of the lifting platform, the flanges 28 will engage the end portions 27 and thereby upwardly lift the intermediate platform section to the position shown in Figure 1.

When a sled is positioned upon the scale platform to be unloaded, the yoke-shaped member 24 will be moved to the position shown in Figure 2, and the lifting platform 12 elevated to the position shown in Figure 1. Such upward movement of the lifting platform 12 will cause the inwardly projecting flanges 28 thereof to be moved into engagement with the end portions 27 of the yoke member 24, thereby causing the latter to be elevated with the lifting platform with the resultant tilting of the intermediate platform section 19. By thus upwardly lifting and tilting the rear runners of the sled it will be noted that the connecting means or reach 41 between the front and rear runners of the sled will not be brought into contact with the rear edge-portion of the lifting platform 12. It will also be noted that the relative movement between the box 42 and the bolster 43 of the sled will be very slight, thereby preventing any unnecessary strain from being imparted to any portion of the sled, which might result in damage thereto. When the load has been discharged from the sled, the lifting platform may be lowered to its normal position, as shown in Figure 2.

The yoke-shaped member 24 is preferably mounted upon the hinged section 19 of the scale platform so that when in inoperative position as shown in Figure 4, it will be carried by the scale platform and will, therefore, not interfere with the weighing scale when in inoperative position as shown in Figure 4, or when inoperatively connected to the lifting mechanism of the scale as shown in Figure 1. By thus mounting the yoke 24 and its operating mechanism directly upon the hinged section 19 of the dumping platform, the hinged section 19 may be used in connection with a platform scale having the lifting mechanism of the dumping platform thereof, carried either by the scale frame or mounted upon a stationary foundation beneath the scale platform. When mounted beneath the scale platform as above stated, such mechanism obviously must be out of contact with the weighing platform in order not to interfere with the weighing thereof.

To adapt the apparatus for a vehicle with wheels, it will only be necessary to release the connection between the tilting section of the platform and the lifting platform 12 and thereupon the tilting section will remain stationary and form a horizontal continuation of the platform 9 and adapt the apparatus for dumping a wheeled vehicle, the forward portion being raised in substantially the same manner as shown and described in the patent above referred to. To adapt the apparatus for dumping a sled vehicle it is only necessary to connect the tilting section with the lifting platform and this can be easily and quickly done by the manipulation of the operating bar 37. Evidently, during the summer months or when a sled vehicle is not in use the tilting section will be inactive and it will not be necessary to use any excess of power for raising and lowering it. As soon, however, as it is desired to dump a sled vehicle the operator can immediately connect the tilting section with the lifting platform, and thereupon, when the lifting plateform is raised to elevate the forward portion of the vehicle, a corresponding movement will be imparted to the forward end of the tilting section so that it will be raised sufficiently to form a substantial support for the rear runners of the vehicle and prevent any unnecessary or dangerous strain on the reach or bolsters of the sled. In effecting this connection between the tilting section and the lifting platform, the operating bar 37 is actuated to oscillate the yoke-shaped member 24 and if it is desired to effect a lifting of the tilting section, the ends of the yoke-shaped member are engaged with the lifting flanges 28 so that when the platform 12 is lifted, a corresponding movement will be imparted to the tilting section. To separate these members, the operator will again grasp the bar 37 and move the end portions 27 out of alignment with the ends of the lifting flanges 28 so that when the lifting platform is elevated the flanges will pass the ends 27 without coming in contact therewith.

I claim as my invention:

1. A vehicle dumping platform comprising a supporting and raising means for the forward portion of the vehicle, means normally stationary and adapting the apparatus for dumping a wheeled vehicle, but adapted to be moved and form an inclined support for the rear runners of a sled vehicle.

2. A vehicle dumping platform comprising a supporting and raising means for the forward portion of the vehicle, means forming normally a stationary continuation of said dumping platform to support the rear wheels of a wheeled vehicle but adapted to be raised and form a support for the rear runners of a sled vehicle.

3. A vehicle dumping platform comprising a raising means for the forward portion of the vehicle, means normally stationary for supporting the rear wheels of a wheeled vehicle, and means for elevating said raising means and said stationary means to adapt them for dumping a sled vehicle.

4. A vehicle dumping platform comprising a raising means for the forward portion of the vehicle, a tilting platform section adapted to support the rear wheels of the vehicle, and means for moving said platform section to an inclined position and adapting it for dumping a sled vehicle.

5. A vehicle dumping platform comprising a supporting and raising means for the forward portion of the vehicle, a hinged platform section normally adapted to support the rear wheels of a vehicle and means for lifting said platform section to an inclined position when said raising means is elevated to adapt the apparatus for unloading a sled vehicle.

6. A vehicle dumping platform comprising in combination, a lifting section for supporting and elevating the forward portion of a vehicle to discharge its load, a hinged section for supporting the rear wheels or runners of the vehicle, and means adapted operatively to connect said hinged section with said lifting section for the purpose of tilting it to an inclined position when said lifting section is elevated.

7. A vehicle dumping platform comprising in combination a lifting section for supporting and elevating the forward portion of a vehicle to discharge its load, a hinged section for supporting the rear wheels or runners of the vehicle, and means mounted on and carried by said hinged section and adapted to connect it with said lifting section to tilt said hinged section to an inclined position when said lifting section is raised.

8. A vehicle dumping platform comprising a raising means for the forward portion of the vehicle, a platform section, a yoke mounted thereon and having means for engaging supports on said raising means, a mechanism for operating said yoke to engage it with said supports or disengage it therefrom, said platform section when connected with said raising means being tilted to an inclined position to adapt it for supporting the rear runners of a sled vehicle.

9. A vehicle dumping platform comprising a supporting and raising means for the front portion of the vehicle, and means supporting the rear portion and normally horizontal for a wheeled vehicle but adapted to be raised to support a vehicle with runners.

10. A vehicle dumping platform comprising a supporting and raising means for the front portion of the vehicle and means supporting the rear portion and normally horizontal for a wheeled vehicle but adapted to be raised to an inclined position to form a comparatively long bearing for the rear shoes of a vehicle with runners.

11. A vehicle dump comprising a supporting and raising means for the forward portion of the vehicle, a support for the rear shoes of a sled vehicle and means for connecting said support with said raising means for tilting said support to an inclined position to support the rear runners during the dumping operation.

In witness whereof, I have hereunto set my hand this 25th day of February, 1925.

WALTER G. ANDERSON.